United States Patent [19]
Adelhed

[11] 3,760,795
[45] Sept. 25, 1973

[54] SLEEVE FOR MEASURING BLOOD PRESSURE

[75] Inventor: Ter Je Adelhed, Solna, Sweden

[73] Assignee: Siemens Aktiengesellschaft, Erlangen, Germany

[22] Filed: Jan. 12, 1972

[21] Appl. No.: 217,335

[30] Foreign Application Priority Data
  Feb. 1, 1971  Sweden.............................. 1185/71

[52] U.S. Cl............................................ 128/2.05 C
[51] Int. Cl............................................... A61b 5/02
[58] Field of Search.................. 128/2, 2.05, 2.05 C

[56] References Cited
UNITED STATES PATENTS

| | | | |
|---|---|---|---|
| 1,269,620 | 6/1918 | Levine | 128/2.05 C |
| 2,758,593 | 8/1956 | Berman | 128/2.05 C |
| 2,678,040 | 5/1954 | Poole et al. | 128/2.05 C |
| 2,582,123 | 1/1952 | Heitz | 128/2.05 C |

OTHER PUBLICATIONS

IEEE Transactions On Bio-Medical Engineering "Intermittent Occlusion Systems" Page 352 Dated October 1970

Primary Examiner—Aldrich F. Medbery
Attorney—Richards & Geier

[57] ABSTRACT

A sleeve for measuring blood pressure has an inner hollow space connected with a source of pressure means. The invention is particularly characterized by the provision of an inner tubular piece consisting of an elastic thermoplastic artificial material and an outer tubular piece of substantially the same length consisting of bendable thermoplastic artificial material which is provided with a connection to the inner space. The inner space is formed by welding the edges of the two pieces, said edges extending substantially transversely to the longitudinal direction of the pieces.

4 Claims, 4 Drawing Figures

SLEEVE FOR MEASURING BLOOD PRESSURE

This invention relates to a sleeve for measuring blood pressure provided with an inner hollow space and a connection communicating with this space to connect the sleeve with a source of pressure means and a pressure measuring device.

It has been known for a long time to use a sleeve for measuring human blood pressure. Such a sleeve had an inner hollow space with walls of, for example, rubber provided with a textile reinforcement, as well as a connection for joining the hollow space with a source of pressure means, for example, a pump and a pressure measuring device, such as a mercury manometer or the like. The sleeve has usually the shape of a band and the hollow space is within the band. It is placed around the desired part of the body, mostly the arm and is adapted to that body part by a device which adjustably interconnects the two ends of the band. Blood pressure is measured by introducing pressure means, generally air, into the hollow space of the sleeve while simultaneously increasing pressure in the hollow space, so that the side of the sleeve lying against the body part exerts a pressure against the body part, whereby at a certain pressure in the hollow space blood vessels in the body part are blocked. Then the pulse cannot be ascertained in that section of the body part which is separated by the sleeve from the heart.

While the known and used blood pressure measuring sleeves are suitable for their purposes, they have various drawbacks. For example, they are not easy to clean due to the textile reinforcement and despite the usual cleaning there is the danger that a patient may be infected by a previous patient since at the present time the same blood pressure measuring sleeve is used for very many patients.

An object of the present invention is to provide a blood pressure measuring sleeve which will not have various drawbacks of existing sleeves.

Other objects of the present invention will become apparent in the course of the following specification.

In accordance with the present invention the sleeve in its entirety is made of an artificial material so that it can be cleaned very easily and thus in many cases can be used for numerous patients without hygienic doubts. Since it constitutes a single unit attached as a removable part to a source of pressure and pressure measuring device in case of danger or suspicion of infection it can be thrown away immediately after use without hesitation, since it is very cheap to manufacture.

Furthermore, the sleeve made of an artificial material in accordance with the present invention is very light in weight and thus can be worn for a long time without any serious drawback or discomfort. This has the advantage that perspiration occurring during working-physiological measurements will not have the same unsatisfactory results as in the case of existing blood pressure measuring sleeves consisting partly of a fabric.

The sleeve constructed in accordance with the present invention has substantially the shape of a ring which is placed over the corresponding part of the body. Thus the sleeve can be preferably made in a few different sizes so as to be advantageously adapted to the body part during the measuring of blood pressure. It is easy to indicate the sizes, for example, by different coloring.

Since the sleeve of the present invention is very cheap to manufacture, a patient in a hospital can be given his own sleeve at the time of the first blood pressure measuring, which he keeps during the entire time he is in the hospital and which is then thrown away. The possibility of using personal sleeves depends upon the fact that the sleeve of the present invention has a separate connecting joint, so that the same pressure source and pressure measuring device can be attached to the sleeve being used.

On the other hand known sleeves are always firmly connected with a pressure measurer and a pressure ball or a similar source of pressure.

The invention will appear more clearly from the following detailed description when taken in connection with the accompanying drawings showing by way of example only, preferred embodiments of the inventive idea.

Figure 1:
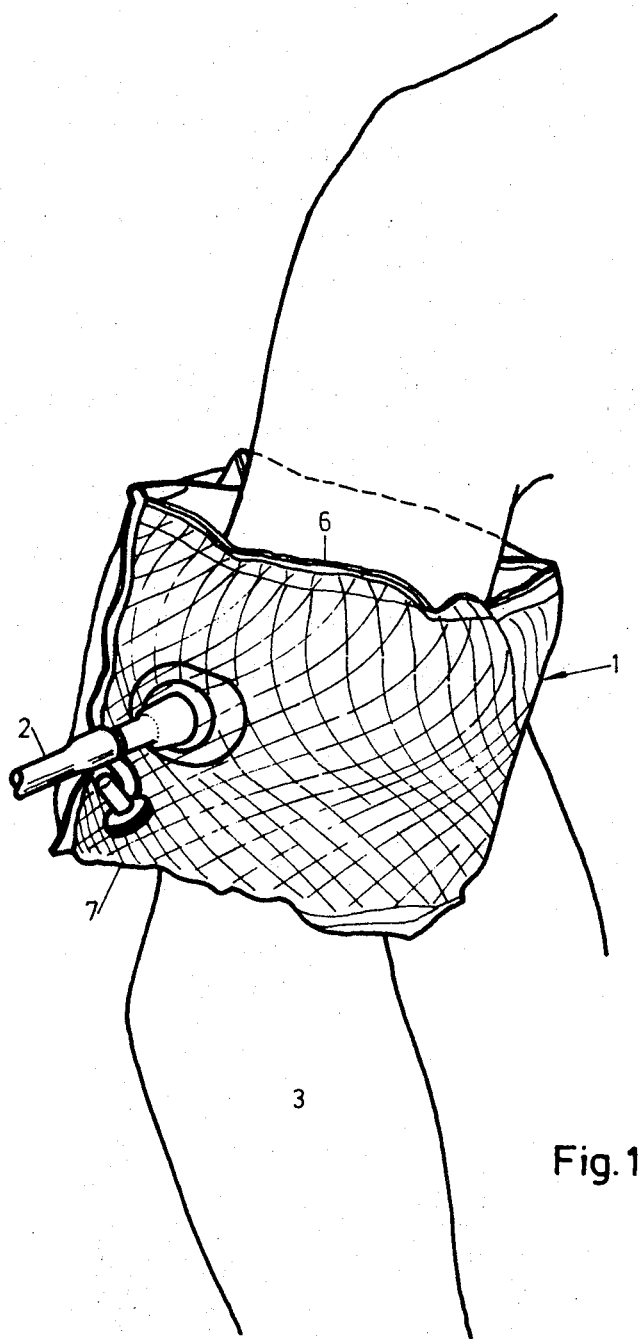
FIG. 1 is a perspective view of a sleeve of the present invention as applied to an arm.

As shown in the drawings the blood pressure measuring sleeve of the present invention consists of a closed ring 1 with two end edges 6 and 7. These edges 6 and 7 constitute sealing connections between an outer tubular piece 4 and an inner tubular piece 5 which form the sleeve. Thus a hollow space 8 is provided between the outer sleeve wall, namely, the tubular piece 4 and the inner sleeve wall, namely, the tubular piece 5. The space 8 is completely closed with the exception of a connection with a source of pressure medium and a pressure measurer (manometer) through a connecting piece 2.

The connecting piece 2 is shown here as a hose, but it can also consist of a connecting joint made of plastics, to which a hose is connected in the usual manner.

Figure 3:
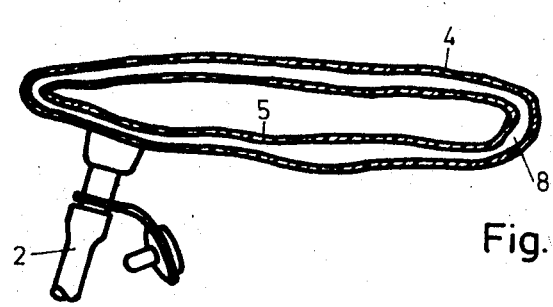
FIG. 3 is a section along the line III—III of FIG. 2.

The section of FIG. 3 illustrates a construction wherein the inner tubular piece 5 is completely free in relation to the outer tubular piece 4 aside from the sealing connections between the tubular pieces 4 and 5 along their end edges 6 and 7.

Figure 4:
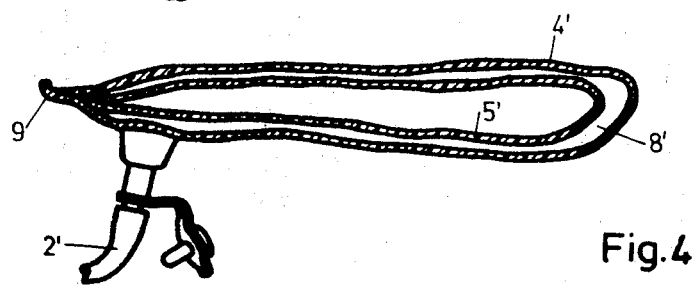
FIG. 4 is a similar section through a somewhat different construction.

In the modification shown in section in FIG. 4 the outer and inner tubular pieces 4' and 5' are also firmly connected at their end edges and enclose a hollow space 8' connected to the hose 2'. In addition the two tubular pieces 4' and 5' are joined along an edge 9 extending in their longitudinal direction. This type of manufacture is described in detail hereinafter. The connection between the outer wall and the inner wall in the longitudinal direction has no drawbacks and the above-described advantages of the present invention remain in full force and effect.

As already stated the sleeve walls 4 and 5, as well as sleeve walls 4' and 5' consist of an artificial material. To provide a good engagement of the inner wall 5 with the corresponding body part 3, the inner wall is made elastic out of a thin thermoplastic material, such as PVC, with a thickness of 0.2 mm. The outer wall is made more rigid, although it is also thoroughly bendable, out of a thermoplastic material having a thickness of, for example, 0.3 mm. The plastic material forming the outer wall 4 is preferably provided with a reinforcement of glass fiber threads, which for example are applied in the form of a net with a mesh width of about 5 mm. in such manner that the threads form an angle of about 45° with the longitudinal axial direction of the tubular piece 4. The reinforcement can also contain glass fiber threads extending at a distance from each other in the longitudinal direction of the tube, the distance being equal to the diagonal of the above-mentioned meshes. A reinforcement of this type makes the outer wall more rigid while it is still sufficiently bendable in the circumferential direction of the sleeve, so that it is well adaptable to the shape of the body part 3.

Figure 2:
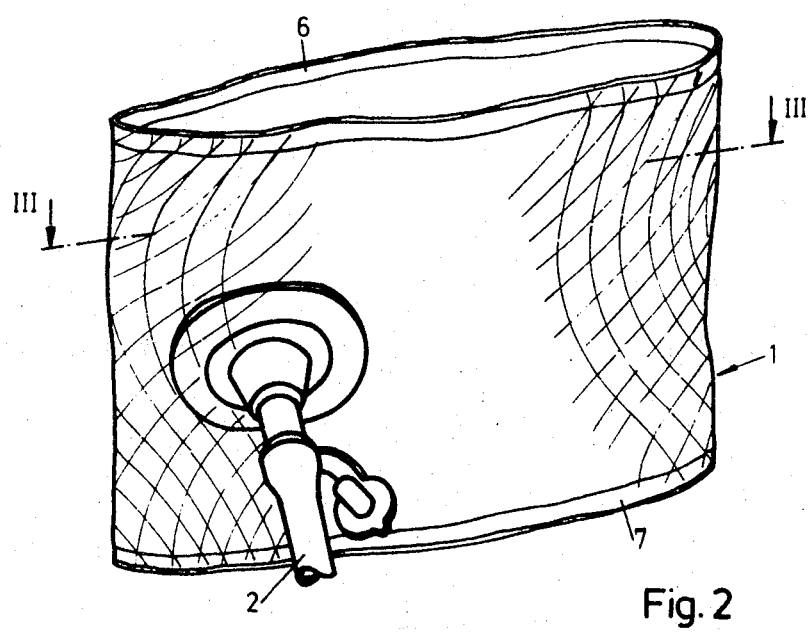
FIG. 2 shows the sleeve flattened for preservation.

As already stated, the sleeve of the present invention can be manufactured very cheaply. Thus a sleeve corresponding substantially to that shown in FIG. 3 can be made by joining two tubes of an artificial material, the tube forming the inner wall 5 having a lesser wall thickness than the tube forming the outer wall 4 and also consisting of a thermoplastic material, possibly reinforced by glass fiber threads, the joining being carried out by pushing the first tube forming the inner wall 5 into the second tube forming the outer wall 4. Then the well known and substantially automatically operating shifting and welding devices with suitably shaped welding jaws are used to weld together the two tubes to provide sealing end edges 6 and 7 of FIG. 2. These edges are formed of welded band shaped end portions of the two tubes. After this welding a cutting takes place perpendicularly to the longitudinal direction of the tubes within these welded band shaped portions. Thus ring-shaped sleeves are produced with inner walls 5 and outer walls 4 with the hollow space 8 located in between. The connection 2 which may consist of a hose or of a connecting joint or tube made substantially from a thermoplastic material, is applied in tight connection to the outer wall preferably prior to the welding of the edges 6 and 7, such spaces being provided that the connection 2 lies at the predetermined location at the outer wall of the sleeve 1 after the tubes 4 and 5 have been welded and the welded parts cut.

The above-described first and second tubes forming the outer wall 4 and the inner wall 5 are produced by casting or pressure extruding. However, a band also can be used the two longitudinal edges of which are so welded in an automatic welding machine that a tube or hose is produced. The hose or tubes thus produced are then used in the above-described manufacturing process.

According to a different manufacturing process for making the embodiment of the present invention shown in FIG. 4, two bands of substantially equal widths are used consisting of materials used for the outer wall 4 and the inner wall 5. These two bands are placed together in a preferably automatically operating welding machine, wherein preferably first the connecting hose 2, or a corresponding joint, is applied at predetermined spaces to the band which will constitute the outer wall 4. Then strip-like sections are welded together transversely to the longitudinal direction of the two bands, said sections forming the end edges 6 and 7 of the finished sleeves. Obviously, a separate connecting piece 2 is provided between two welded strips which follow each other. Then all four longitudinal side edges of the two bands are welded together in the longitudinal direction to produce an edge 9 consisting of all four band edges joined by welding. Finally the welded transverse edges corresponding to edges 6 and 7, are cut transversely to the direction of the bands to produce finished sleeves.

The above-described reinforcement of the material forming the outer wall 4 with glass fiber threads takes place prior to the above-described manufacturing steps.

It is apparent that various changes can be made in the described embodiments within the scope of the appended claims.

I claim:

1. A sleeve for measuring blood pressure, comprising an inner tubular piece consisting of an elastic thermoplastic material, an outer tubular piece enclosing said inner tubular piece and consisting of bendable thermoplastic material with glass fiber reinforcement, said glass fiber reinforcement having glass fiber threads forming a net with some threads extending at an angle of substantially 45° to the longitudinal direction of the tubular pieces, other glass fiber threads extending parallel to each other in said longitudinal direction and located at equal distances from each other equal to the diagonals of the meshes of said net, the inner tubular piece being devoid of glass fiber reinforcement, the two tubular pieces being of substantially equal length, the outer tubular piece consisting of a thicker thermoplastic material than the inner tubular piece, said tubular pieces having adjacent longitudinal edges which are joined by welding defining a flat torus sleeve having a closed inner space formed between the two tubular pieces, and a pressure supplying piece carried by said outer tubular piece and communicating with said inner space.

2. A sleeve in accordance with claim 1, wherein the inner and outer tubular pieces are completely free relatively to each other with the exception of their welded edges.

3. A sleeve in accordance with claim 1, wherein the inner and outer tubular pieces are also joined along a line extending substantially in the longitudinal direction of the tubular pieces.

4. A sleeve in accordance with claim 8, wherein said connecting piece consists of a joint made of a thermoplastic material and receiving a connecting hose.

* * * * *